United States Patent [19]
Arzu

[11] Patent Number: 5,685,255
[45] Date of Patent: Nov. 11, 1997

[54] FLAG WARNING DEVICE

[76] Inventor: Sidney R. Arzu, 13715 Kismet Ave., Sylmar, Calif. 91342

[21] Appl. No.: 625,374

[22] Filed: Apr. 1, 1996

[51] Int. Cl.[6] ............................ B60Q 7/02; G09F 17/00
[52] U.S. Cl. ............................ 116/30; 116/63 T; 116/173
[58] Field of Search .................. 40/602, 903; 116/28 R, 116/30, 63 P, 63 T, 175

[56] References Cited

U.S. PATENT DOCUMENTS

| | | | |
|---|---|---|---|
| 1,150,444 | 8/1915 | Martter . | |
| 1,242,429 | 10/1917 | Enochty . | |
| 2,130,467 | 9/1938 | MacKay | 116/30 |
| 2,887,983 | 5/1959 | Budd | 116/63 P |
| 4,440,104 | 4/1984 | Bleiweiss et al. . | |
| 4,910,898 | 3/1990 | Hector . | |
| 5,048,451 | 9/1991 | Reimers et al. . | |
| 5,088,439 | 2/1992 | Anderson | 116/30 |
| 5,398,473 | 3/1995 | Bump, Jr. et al. . | |

FOREIGN PATENT DOCUMENTS

| | | | |
|---|---|---|---|
| 540978 | 9/1955 | Belgium | 116/63 P |
| 1346357 | 11/1963 | France . | |
| 1456869 | 9/1966 | France | 116/63 P |
| 2535529 | 3/1976 | Germany | 116/63 P |
| 503612 | 12/1954 | Italy | 116/63 P |
| 588912 | 2/1959 | Italy | 116/63 P |
| 53540 | 3/1983 | Japan | 116/28 R |
| 443071 | 1/1968 | Switzerland | 116/63 P |
| 966728 | 8/1964 | United Kingdom | 116/63 P |

*Primary Examiner*—William A. Cuchlinski, Jr.
*Assistant Examiner*—Willie Morris Worth
*Attorney, Agent, or Firm*—Thomas I. Rozsa; Tony D. Chen

[57] ABSTRACT

A flag warning device for attachment to extended loads such as ladders or extended items that are in the trunk of a standard vehicle and which are too large to fit in the ordinary trunk and therefore require the trunk to be opened while the items extend out from the back. The flag warning device comprises a central portion which has an open mesh type surface so that the wind can blow through it and therefore cause it to remain essentially vertical so that it can be easily seen by the oncoming traffic. The flag warning device has a hinge assembly which can be locked into the 90° position further serves to secure the flag in the vertical position to assure that it can be easily seen by oncoming traffic.

32 Claims, 2 Drawing Sheets

FLAG WARNING DEVICE

BACKGROUND OF THE INVENTION

1. Field of the Invention

The present invention generally relates to the field of warning devices. More particularly, the present invention relates to the field of flag warning devices which are attached to extended loads such as ladders or extended items that are in the trunk of a standard vehicle or on the bed of a truck.

2. Description of the Prior Art

The problem with most existing flag devices is that they are usually rags or colored pieces of paper which are scotch-taped or otherwise affixed to the end of a wide load. The problem is that as the vehicle is traveling on the road, the wind blows the flag device and either entirely blows it off the end of the wide load or alternatively, blows it up so that it is essentially horizontal in the air which makes it very difficult for drivers of oncoming vehicles to notice it.

The following seven (7) prior art patents were uncovered in the pertinent field of the present invention:

1. U. S. Pat. No. 1,150,444 issued to Martter on Aug. 17, 1915 for "Louver Sign"(hereafter "the Martter Patent");
2. U. S. Pat. No. 1,242,429 issued to Enochty on Oct. 9, 1917 for "Display Stand"(hereafter "the Enochty Patent");
3. U. S. Pat. No. 4,440,104 issued to Bleiweiss et al. on Apr. 3, 1984 for "Emergency Warning Device" (hereafter "the Bleiweiss Patent");
4. U. S. Pat. No. 4,910,898 issued to Hector on Mar. 27, 1990 for "Rotatable Sign Carrying Device"(hereafter "the Hector Patent");
5. U. S. Pat. No. 5,048,451 issued to Reimers et al. on Sep. 17, 1991 for "Vehicle Caution Sign"(hereafter "the Reimers Patent");
6. U. S. Pat. No. 5,398,437 issued to Bump, Jr. et al. on Mar. 21, 1995 for "Warning Device For Vehicles And The Like"(hereafter "the Bump Patent"); and
7. French Patent No. 1,346,357 (hereafter "the '357 French Patent").

The Martter Patent discloses a louver sign which is used in ventilating the basement of store rooms etc. and adapted to be placed directly beneath the usual form of plate glass front.

The Enochty Patent discloses a display stand. It comprises a series of perforations, wherein the effect is that the paint will not peel off.

The Bleiweiss Patent discloses an emergency warning device. It comprises a base and three arms extending upwardly from the base to define an equilateral triangle, wherein one of the arms extends horizontally on the base and the other two arms extend upwardly. Each arm has reflective and fluorescent portions on opposed surfaces. The fluorescent portions of the arms have spaced walls and each wall has at least one opening therethrough. The opening in one wall is staggered with respect to the opening in the other wall such that portions of one wall overlie the opening in the other wall and such that air striking the device flows in a sinuous path through the device reducing the drag on the device.

The Hector Patent discloses a rotatable sign carrying device. It has a rotatable structure with panels pivotally mounted therein, where the panels pivot in response to wind pressure applied on their surfaces.

The Reimers Patent discloses a vehicle caution sign which is attached to the side of a vehicle. The sign is held by an elongated member which is coupled by a first pivot to a mounting member that is attached to the vehicle. The first pivot enables the sign to be swung in a fore and aft direction, either relative to and toward the vehicle or from the vehicle.

The Bump Patent discloses a warning device for vehicles and the like. The warning device is a safety banner device which can be mounted over the rear of the car and allow oncoming cars to see the flashers through the banner material.

The '357 French Patent, as disclosed from the figures shows an attachment apparatus for a vehicle.

It is desirable to have a very efficient and also very effective design and construction of a flag warning device which can avoid the prior art problems. It is also desirable to have a new apparatus which has a mesh structure formed on the flag such that the flag is attached to the vehicle so that oncoming vehicles can notice it.

SUMMARY OF THE INVENTION

The present invention is a unique flag warning device which is attached to extended loads such as ladders or extended items that are in the trunk of a standard vehicle or bed of a truck and which are too large to fit in the ordinary trunk and therefore require the trunk to be opened while the items extend out the back. The flag warning device can also be usable on extended lengthy items such as a ladder which extends out from the back of a truck.

The flag warning device has a central portion which has an open mesh type surface so that the wind can blow through it and therefore cause it to remain essentially vertical. By having the mesh type surface on the flag, the wind can blow through the openings of the mesh surface as the vehicle is traveling so that the flag does not blow upwardly but is instead caused to remain in a vertical position so that it can be easily seen by the oncoming traffic. The flag warning device further has a hinge assembly which can be locked into the 90° position to secure the flag in the vertical position to assure that it can be easily seen by oncoming traffic. The hinge assembly includes a hingeable rod attached to its back side which can be rotated down and folded flat and parallel against the back side of the flag device when it is not in use and then rotated to a 90° position when it is in use so that the rod can be attached to the load by scotch tape or other suitable method. Various warnings can be written on the surface of the flag such as "DANGER", "WIDE LOAD" etc. Through this apparatus, the flag warning device can be secured to the extended load so that there is no chance whatsoever that it will blow off.

It has been discovered, according to the present invention, that by providing a flag warning device with a central portion that has an open mesh type surface, then wind can blow through it and therefore cause the flag warning device to remain essentially vertical.

It has further been discovered, according to the present invention, that by providing a flag warning device with a hinge assembly, then the flag warning device can be locked into a 90° position to secure the flag warning device in the vertical position to assure that it can be easily seen by oncoming traffic.

It is therefore an object of the present invention to provide a flag warning mechanism, where the flag warning device has a central portion with an open mesh type surface, such that the wind can blow through the openings of the mesh surface as the vehicle is traveling so that the flag warning device does not blow upwardly but is instead caused to remain in a vertical position so that it can be easily seen by the oncoming traffic.

It is an additional object of the present invention to provide a flag warning device with a hinge assembly, where the flag warning device can be locked into a 90° position to secure the flag warning device in the vertical position to assure that it can be easily seen by oncoming traffic. The hinge assembly includes a hingeable rod attached to its back side which can be rotated down and folded flat and parallel against the back side of the flag device or rotated to a 90° position such that the rod is perpendicular to the flag and attached to the load by scotch tape or other suitable method.

It is a further object of the present invention to provide a flag warning device, where the mesh surface has various warnings which can be written on the surface of the flag warning device such as "DANGER", "WIDE LOAD" etc. so that it can be easily seen by the oncoming traffic.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
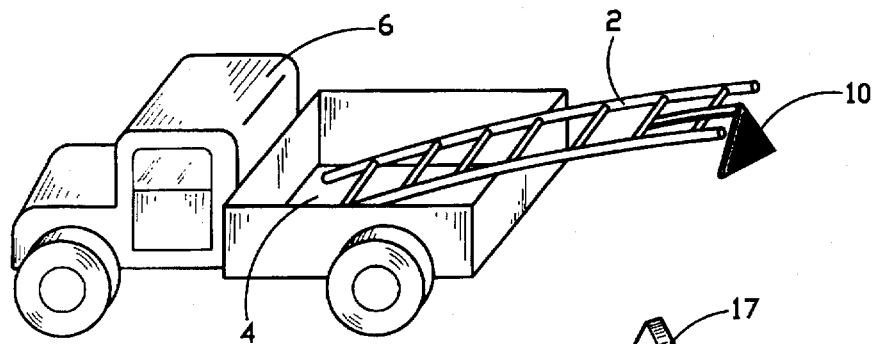
FIG. 1 is an illustration of the present invention flag warning device attached to a load which is stored in a bed of a truck.

Referring to FIG. 1, there is shown an illustration of the present invention flag warning device 10 attached to a load 2 which is stored in a bed 4 of a truck 6. It will be appreciated that the truck 6 depicted above is merely one illustrative embodiment and the present invention can be attached to the load 2 which is stored in a trunk of a standard vehicle (not shown).

Figure 2:
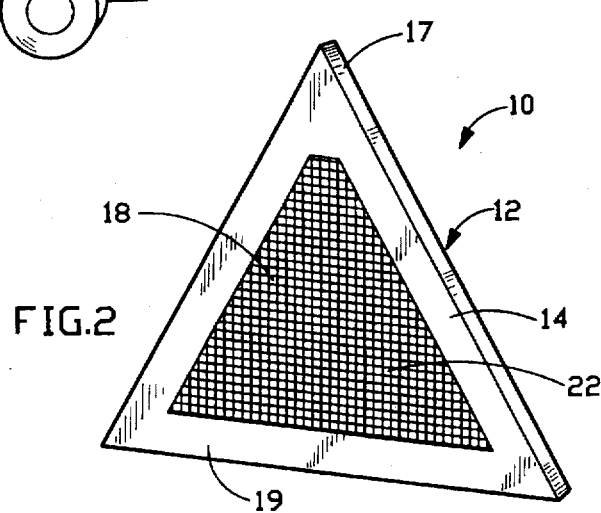
FIG. 2 is a front perspective view of the present invention flag warning device, showing a triangular shaped frame.
Figure 3:
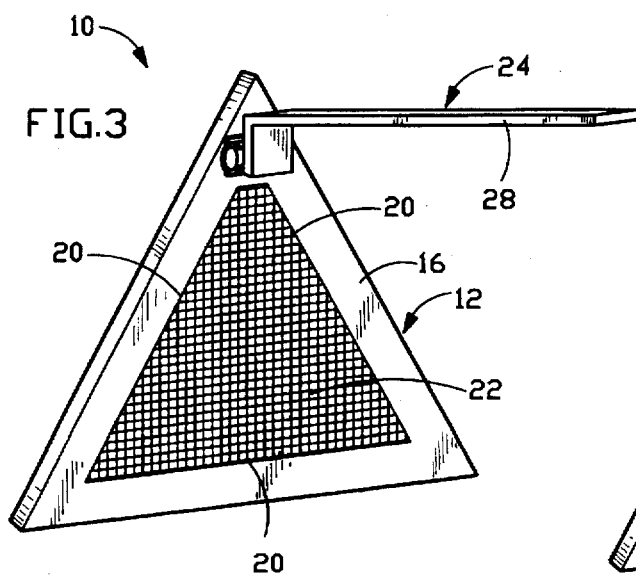
FIG. 3 is a back perspective view of the present invention flag warning device, showing a hingeable rod rotated perpendicular to the triangular shaped frame.
Figure 4:
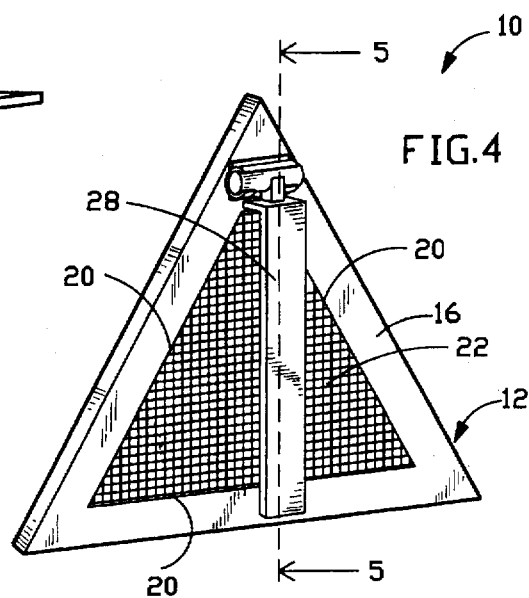
FIG. 4 is a back perspective view of the present invention flag warning device, showing the hingeable rod rotated downwardly and parallel to the triangular shaped frame.

Referring to FIGS. 2, 3 and 4, there are shown perspective views of the present invention flag warning device 10 which generally has a triangular shaped frame 12. The frame 12 includes a front side 14, a back side 16, a sharp pointed upper end 17, a bottom end 19, a central open portion 18, and three inner edges 20 which surround the central open portion 18.

A mesh structure 22 is integrally molded to the inner edges 20 of the triangular shaped frame 12 and located within the central open portion 18 for allowing wind to blow through the mesh structure 22 so that the flag warning device 10 does not blow upwardly but is instead caused to remain in a vertical position. The frame 12 and integral mesh structure 22 can be made of any suitable material such as plastic, metal, etc..

Figure 5:
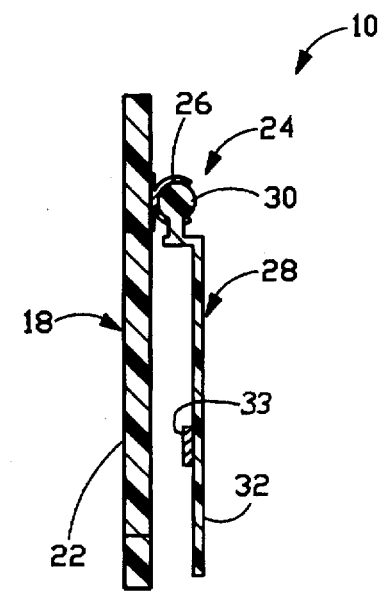
FIG. 5 is a cross sectional view taken along line 5—5 of FIG. 4.

Referring to FIGS. 3, 4 and 5, there is shown at 24 a hinge assembly which includes a generally C-shaped base 26 and a hingeable rod 28. The C-shaped base 26 is integrally formed to the back side 16 of the triangular shaped frame 12 and located adjacent to the upper end 17. The C-shaped base 26 may be attached to the triangular shaped frame 12 by any suitable means known in the art. The hingeable rod 28 has a cylindrical shaped proximal end 30 and a distal end 32 which forms a handle. The cylindrical shaped proximal end 30 of the hingeable rod 28 is hingeably secured to the C-shaped base 26 such that the hingeable rod 28 can be rotated upwardly and perpendicular to the back side 16 of the triangular shaped frame 12 for fastening the hingeable rod 28 to a load by any suitable means such as VELCRO®, tape, etc.. The hingeable rod 28 can be rotated downward such that it is flat and parallel against the back side 16 of the triangular shaped frame both for storage and alternately also for securing the flag warning device to the load by VELCRO® type fasteners or other fastening means on the rod 28 which are known in the art.

The mesh structure 22 of the flag warning device 10 has various warnings which can be written thereon so that it can be easily seen by oncoming traffic. By way of example, the various warnings may be "DANGER", "WIDE LOAD" etc.

The operation of the foregoing embodiment now will be described. The hingeable rod 28 can be locked into the 90° position to secure the flag warning device 10 in the vertical position so that the wind can blow through the mesh structure 22 to assure that it can be easily seen by oncoming traffic (see FIG. 3). The hingeable rod 28 can be rotated down into a locked position to secured it to the load by scotch tape or other suitable means (see FIG. 4).

Figure 7:
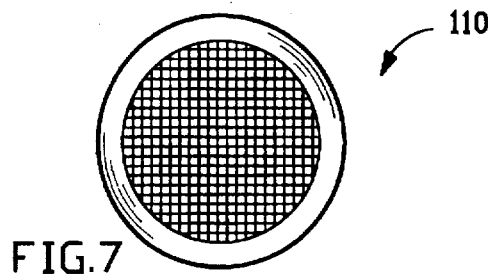
FIG. 7 is a front elevational view of another alternative embodiment of the present invention flag warning device, showing a circular shaped frame.
Figure 8:
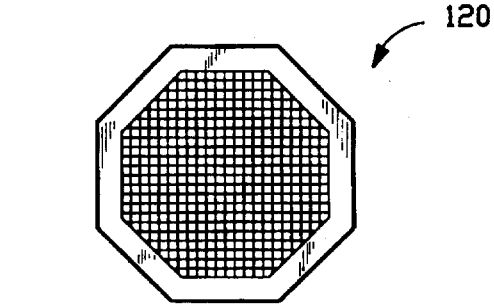
FIG. 8 is a front elevational view of a further alternative embodiment of the present invention flag warning device, showing a hexagonal shaped frame.
Figure 9:
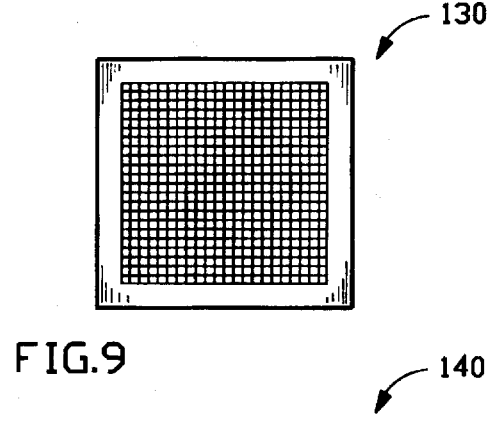
FIG. 9 is a front elevational view of still a further alternative embodiment of the present invention flag warning device, showing a square shaped frame.
Figure 10:
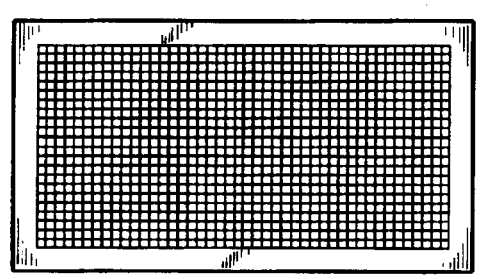
FIG. 10 is a front elevational view of still another alternative embodiment of the present invention flag warning device, showing a rectangular shaped frame.

It will be appreciated that the flag warning device 10 is not limited to the triangular shaped frame 12 as illustrated in FIGS. 1 through 4. It is emphasized that while the triangular shaped frame 12 is the preferred embodiment, it is also within the spirit and scope of the present invention to have a multiplicity of different shaped frames of the present invention flag warning device. By way of example, FIG. 7 depicts a generally circular shaped flag warning device 110; FIG. 8 depicts a generally hexagonal shaped flag warning device 120; FIG. 9 depicts a square shaped flag warning device 130; and FIG. 10 depicts a rectangular shaped flag warning device 140. The mesh structure is attached to the frame by the same method as described above or the method described below.

The present invention conforms to conventional forms of manufacture or any other conventional way known to one skilled in the art, and is of simple construction and is easy to use. The flag warning device can be made from several materials. By way of example, the flag warning device can be made of plastic material.

The present invention has many advantageous features including: (a) the flag warning device can be any suitable color; (b) the flag warning device can be any suitable shaped; and (c) the various warnings can be written thereon so that it can be easily seen by oncoming traffic. The hingeable rod 28 is secured to the load 2 by fastening means 33 which can be VELCRO®, tape, etc.

Figure 6:
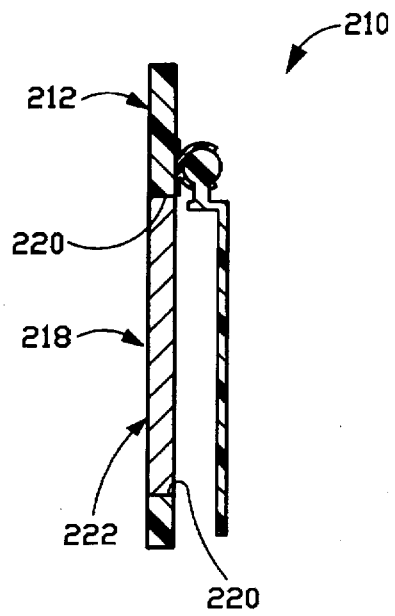
FIG. 6 is a longitudinal cross sectional view of an alternative embodiment of the present invention flag warning device, showing a two piece configuration which is a similar view shown in FIG. 5.

Referring to FIG. 6, there is shown a cross sectional view of an alternative embodiment of the present invention flag warning device 210. In this embodiment, the mesh structure 222 is not integrally molded to the frame 212 but is instead a separate piece which is affixed to the inner edges 220 of the triangular shaped frame 212 by any suitable means known in the art such as glue, tape, etc.. The mesh structure 222 is located within the central open portion 218 for allowing wind to blow through the mesh structure 222 so that the flag warning device 210 does not blow upwardly but is instead caused to remain in a vertical position. The mesh structure 222 can be made from wire metal material, plastic, fabric, or any other suitable material known in the art. The triangular shaped frame 212 is identical to that in the preferred embodiment, and the description thereof will not be repeated.

Therefore, the concept of the present invention is to create a clear warning device which includes a mesh shaped interior which permits wind to blow through the holes in the mesh shaped structure to thereby cause the sign to remain in a vertical position when it is attached to a load that extends out the back of the trunk of a vehicle or out of the bed of a truck. The device can be maintained in a vertical position while the rotatable handle 28 is rotated in a direction perpendicular to the mesh shaped structure so that the handle can be affixed to the load by any suitable fastening means 33 which can be VELCRO®, tape, etc.. In addition, the frame 12 and the mesh structure 22 can be made of bright and even phosphorescent material and colored in a bright color such as red, orange, yellow or lime green etc. to make it clearly visible to oncoming traffic.

While the preferred embodiment of the present invention is generally triangular in shape, it is emphasized that the frame 12 and mesh structure 22 can be of any cross-sectional configuration. Several other illustrative cross-sectional configurations are illustrated in FIGS. 7 through 12. By way of example, the frame and mesh structure can be generally circular shaped as shown at 110 in FIG. 7. Alternatively, the frame and mesh structure can be generally octagonal in shape at 120 in FIG. 8. Alternatively, the frame and mesh structure can be generally square in shape as shown at 130 in FIG. 9. Alternatively, the frame and mesh shaped structure can be generally rectangular in shape as shown at 140 in FIG. 10. It is emphasized that FIGS. 7 through 10 are only some of the numerous alternative types of shapes by which the present invention can be utilized. In each case, the mesh structure has the openings therethrough to permit the wind to blow therethrough which is the key feature of the present invention. Any of the alternative embodiments including those shown in FIGS. 7 through 10 can have the mesh shaped structure integrally formed with the frame as depicted in FIGS. 2 through 5 or alternatively, can have the mesh shaped structure made of different material and adhered to the frame as illustrated in FIG. 6.

Defined in detailed, the present invention is a warning device for attachment to a load, comprising: (a) a generally triangular shaped frame having a front side, a back side, a central open portion, and inner edges surrounding the central open portion; (b) a mesh structure integrally molded to the inner edges of the triangular shaped frame and located within the central open portion for allowing wind to blow through the mesh structure so that the triangular shaped frame does not blow upwardly but is instead caused to remain substantially in a vertical position; (c) a hinge assembly including a base and a hingeable rod, the base attached to the back side of the triangular shaped frame, the hingeable rod rotatably hinged to the base such that the hingeable rod can be rotated to an angled position with regard to the back side of the triangular shaped frame for securing the warning device to the load while keeping the triangular shaped frame in a vertical position; and (d) means for attaching the hingeable rod to the load such that the triangular shaped frame is maintained in the vertical position to assure that the warning device can be easily seen by traffic.

Defined alternatively in detail, the present invention is a warning device for attachment to a load, comprising: (a) a generally triangular shaped frame having a front side, a back side, a central open portion, and inner edges surrounding the central open portion; (b) a separate mesh structure attached to the inner edges of the triangular shaped frame and located within the central open portion for allowing wind to blow through the mesh structure so that the triangular shaped frame does not blow upwardly but is instead caused to remain substantially in a vertical position; (c) a hinge assembly including a base and a hingeable rod, the base attached to the back side of the triangular shaped frame, the hingeable rod rotatably hinged to the base such that the hingeable rod can be rotated to an angled position with regard to the back side of the triangular shaped frame for securing the warning device to the load while keeping the triangular shaped frame in a vertical position; and (d) means for attaching the hingeable rod to the load such that the triangular shaped frame is maintained in the vertical position to assure that the warning device can be easily seen by traffic.

Defined broadly, the present invention is a warning device for attachment to a load, comprising: (a) a frame having a front side, a back side and a central open portion; (b) a mesh structure integrally molded to the frame and located within the central open portion for allowing wind to blow through the mesh structure so that the frame does not blow upwardly but is instead caused to remain substantially in a vertical position; (c) a hinge assembly including a base and a hingeable rod, the base attached to the back side of the frame, the hingeable rod rotatably hinged to the base such that the hingeable rod can be rotated to an angled position with regard to the back side of the frame for securing the warning device to the load while keeping the frame in a vertical position; and (d) means for attaching the hingeable rod to the load such that the frame is maintained in the vertical position to assure that the warning device can be easily seen by traffic.

Defined alternatively broadly, the present invention is a warning device for attachment to a load, comprising: (a) a frame having a front side, a back side and a central open portion;. (b) a separate mesh structure attached to the inner edges of the frame and located within the central open portion for allowing wind to blow through the mesh structure so that the frame does not blow upwardly but is instead caused to remain substantially in a vertical position; (c) a hinge assembly including a base and a hingeable rod, the base attached to the back side of the frame, the hingeable rod rotatably hinged to the base such that the hingeable rod can be rotated to an angled position with regard to the back side of the frame for securing the warning device to the load while keeping the frame in a vertical position; and (d) means for attaching the hingeable rod to the load such that the frame is maintained in the vertical position to assure that the warning device can be easily seen by traffic.

Defined more broadly, the present invention is a warning device for attachment to a load, comprising: (a) a frame having a front side, a back side, a central open portion, and at least one inner edge surrounding the central open portion; (b) a mesh structure integrally formed with the at least one inner edge of the frame and located within the central open portion for allowing wind to blow through the mesh structure so that the warning device does not blow upwardly but is instead caused to remain substantially in a vertical position; (c) a hingeable rod rotatably attached to the back side of the frame, where the hingeable rod can be rotated to an angled position with regard to the back side of the frame for securing the warning device to the load while keeping the frame in a vertical position; and (d) means for attaching the hingeable rod to the load such that the frame is maintained in the vertical position to assure that the warning device can be easily seen by traffic.

Defined alternatively more broadly, the present invention is a warning device for attachment to a load, comprising: (a) a frame having a front side, a back side, a central open portion, and at least one inner edge surrounding the central open portion; (b) a mesh structure affixed to the at least one inner edge of the frame and located within the central open portion for allowing wind to blow through the mesh structure so that the warning device does not blow upwardly but is instead caused to remain substantially in a vertical position; (c) a hingeable rod rotatably attached to the back side of the frame, where the hingeable rod can be rotated to an angled position with regard to the back side of the frame for securing the warning device to the load while keeping the frame in a vertical position; and (d) means for attaching the hingeable rod to the load such that the frame is maintained in the vertical position to assure that the warning device can be easily seen by traffic.

Defined even more broadly, the present invention is a warning device, comprising: (a) a frame having an opening; (b) a mesh structure integrally formed within the opening of the frame for allowing wind to blow through the mesh structure so that the frame remains in a vertical position; and (c) means for securing the warning device such that the frame is maintained in the vertical position to assure that the warning device can be easily seen.

Defined alternatively even more broadly, the present invention is a warning device, comprising: (a) a frame having an opening; (b) a mesh structure affixed within the opening of the frame for allowing wind to blow through the mesh structure so that the frame remains in a vertical position; and (c) means for securing the warning device such that the frame is maintained in the vertical position to assure that the warning device can be easily seen.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A warning device for attachment to a load on a moving vehicle, consisting of:
    (a) a generally triangular shaped frame having a front side, a back side, a central open portion, and inner edges surrounding the central open portion;
    (b) a mesh structure integrally molded to said inner edges of said triangular shaped frame and located within said central open portion, the mesh structure being an open mesh with a plurality of apertures for allowing wind to blow through the plurality of apertures so that said triangular shaped frame does not blow upwardly but is instead caused to remain substantially in a vertical position, said mesh structure having warning indicia thereon;
    (c) a hinge assembly including a base and a hingeable rod, the base attached to said back side of said triangular shaped frame, the hingeable rod rotatably hinged to the base such that the hingeable rod can be rotated to an angled position with regard to said back side of said triangular shaped frame for securing said warning device to said load while keeping said triangular shaped frame in a vertical position; and
    (d) means for attaching said hingeable rod to said load such that said triangular shaped frame is maintained in said vertical position to assure that said warning device can be easily seen by oncoming traffic.

2. The warning device in accordance with claim 1 wherein said frame and mesh structure include color means to make the device easily seen by traffic.

3. The warning device in accordance with claim 1 wherein said triangular shaped frame and said mesh structure are made of plastic material.

4. A warning device for attachment to a load on a moving vehicle, consisting of:
    (a) a generally triangular shaped frame having a front side, a back side, a central open portion, and inner edges surrounding the central open portion;
    (b) a separate mesh structure attached to said inner edges of said triangular shaped frame and located within said central open portion, the mesh structure having a plurality of apertures for allowing wind to blow through the plurality of apertures so that said triangular shaped frame does not blow upwardly but is instead caused to remain substantially in a vertical position, said mesh structure having warning indicia thereon;
    (c) a hinge assembly including a base and a hingeable rod, the base attached to said back side of said triangular shaped frame, the hingeable rod rotatably hinged to the base such that the hingeable rod can be rotated to an angled position with regard to said back side of said triangular shaped frame for securing said warning device to said load while keeping said triangular shaped frame in a vertical position; and (d) means for attaching said hingeable rod to said load such that said triangular shaped frame is maintained in said vertical position to assure that said warning device can be easily seen by oncoming traffic.

5. A warning device for attachment to a load on a moving vehicle, consisting of:
   (a) a frame having a front side, a back side and a central open portion;
   (b) a mesh structure integrally molded to said frame and located within said central open portion, the mesh structure having a plurality of apertures for allowing wind to blow through the plurality of apertures so that said frame does not blow upwardly but is instead caused to remain substantially in a vertical position, said mesh structure having warning indicia thereon;
   (c) a hinge assembly including a base and a hingeable rod, the base attached to said back side of said frame, the hingeable rod rotatably hinged to the base such that the hingeable rod can be rotated to an angled position with regard to said back side of said frame for securing said warning device to said load while keeping said frame in a vertical position; and
   (d) means for attaching said hingeable rod to said load such that said frame is maintained in said vertical position to assure that said warning device can be easily seen by oncoming traffic.

6. The warning device in accordance with claim 5 wherein said frame and mesh structure include color means to make the device easily seen by traffic.

7. The warning device in accordance with claim 5 wherein said frame and said mesh structure are made of plastic material.

8. The warning device in accordance with claim 5 wherein said mesh structure is made of wire metal material.

9. The warning device in accordance with claim 5 wherein said frame is generally a triangular shape.

10. The warning device in accordance with claim 5 wherein said frame is generally a circular shape.

11. The warning device in accordance with claim 5 wherein said frame is generally a hexagon shape.

12. The warning device in accordance with claim 5 wherein said frame is generally a square shape.

13. The warning device in accordance with claim 5 wherein said frame is generally a rectangular shape.

14. A warning device for attachment to a load on a moving vehicle, consisting of:
   (a) a frame having a front side, a back side and a central open portion;
   (b) a separate mesh structure attached to said frame and located within said central open portion, the mesh structure having a plurality of apertures for allowing wind to blow through the plurality of apertures so that said frame does not blow upwardly but is instead caused to remain substantially in a vertical position, said mesh structure having warning indicia thereon;
   (c) a hinge assembly including a base and a hingeable rod, the base attached to said back side of said frame, the hingeable rod rotatably hinged to the base such that the hingeable rod can be rotated to an angled position with regard to said back side of said frame for securing said warning device to said load while keeping said frame in a vertical position; and
   (d) means for attaching said hingeable rod to said load such that said frame is maintained in said vertical position to assure that said warning device can be easily seen by oncoming traffic.

15. The warning device in accordance with claim 14 wherein said frame and mesh structure include color means to make the device easily seen by traffic.

16. The warning device in accordance with claim 14 wherein said frame and said mesh structure are made of plastic material.

17. The warning device in accordance with claim 14 wherein said mesh structure is made of wire metal material.

18. The warning device in accordance with claim 14 wherein said frame is generally a triangular shape.

19. The warning device in accordance with claim 14 wherein said frame is generally a circular shape.

20. The warning device in accordance with claim 14 wherein said frame is generally a hexagon shape.

21. The warning device in accordance with claim 14 wherein said frame is generally a square shape.

22. The warning device in accordance with claim 14 wherein said frame is generally a rectangular shape.

23. A warning device for attachment to a load on a moving vehicle, consisting of:
   (a) a frame having a front side, a back side, a central open portion, and at least one inner edge surrounding the central open portion;
   (b) a mesh structure integrally formed with said at least one inner edge of said frame and located within said central open portion, the mesh structure having a plurality of apertures for allowing wind to blow through the apertures so that said warning device does not blow upwardly but is instead caused to remain substantially in a vertical position, said mesh structure having warning indicia thereon;
   (c) a hingeable rod rotatably attached to said back side of said frame, where the hingeable rod can be rotated to an angled position with regard to said back side of said frame for securing said warning device to said load while keeping said frame in a vertical position; and
   (d) means for attaching said hingeable rod to said load such that said frame is maintained in said vertical position to assure that said warning device can be easily seen by oncoming traffic.

24. The warning device in accordance with claim 23 wherein said frame and mesh structure include color means to make the device easily seen by traffic.

25. The warning device in accordance with claim 23 wherein said frame and said mesh structure are made of plastic material.

26. The warning device in accordance with claim 23 wherein said mesh structure is made of wire metal material.

27. The warning device in accordance with claim 23 wherein said frame is generally a triangular shape.

28. The warning device in accordance with claim 23 wherein said frame is generally a circular shape.

29. The warning device in accordance with claim 23 wherein said frame is generally a hexagon shape.

30. The warning device in accordance with claim 23 wherein said frame is generally a square shape.

31. The warning device in accordance with claim 23 wherein said frame is generally a rectangular shape.

32. A warning device for attachment to a load on a moving vehicle, consisting of:
   (a) a frame having a front side, a back side, a central open portion, and at least one inner edge surrounding the central open portion;
   (b) a mesh structure affixed to said at least one inner edge of said frame and located within said central open portion, the mesh structure having a plurality of apertures for allowing wind to blow through the apertures so that said warning device does not blow upwardly but is instead caused to remain substantially in a vertical position, said mesh structure having warning indicia thereon;

(c) a hingeable rod rotatably attached to said back side of said frame, where the hingeable rod can be rotated to an angled position with regard to said back side of said frame for securing said warning device to said load while keeping said frame in a vertical position; and (d) means for attaching said hingeable rod to said load such that said frame is maintained in said vertical position to assure that said warning device can be easily seen by oncoming traffic.

* * * * *